Dec. 15, 1964   J. W. CORCORAN   3,161,885
FRAMING CAMERA WITH RECTANGULARLY GROUPED FRAME AREA
Filed Feb. 25, 1963                                    2 Sheets-Sheet 1
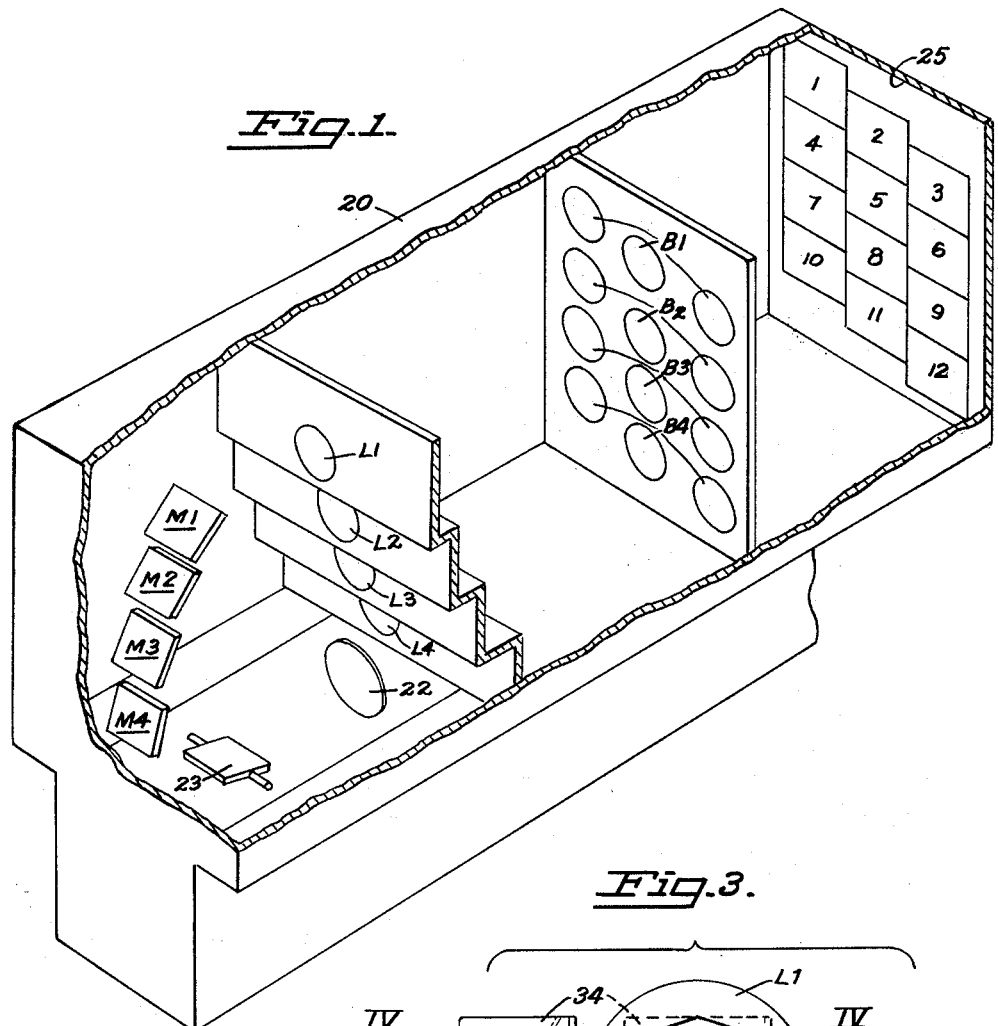
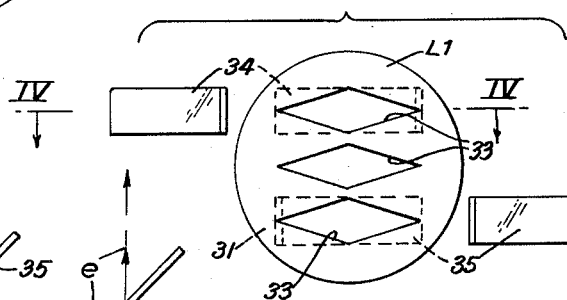
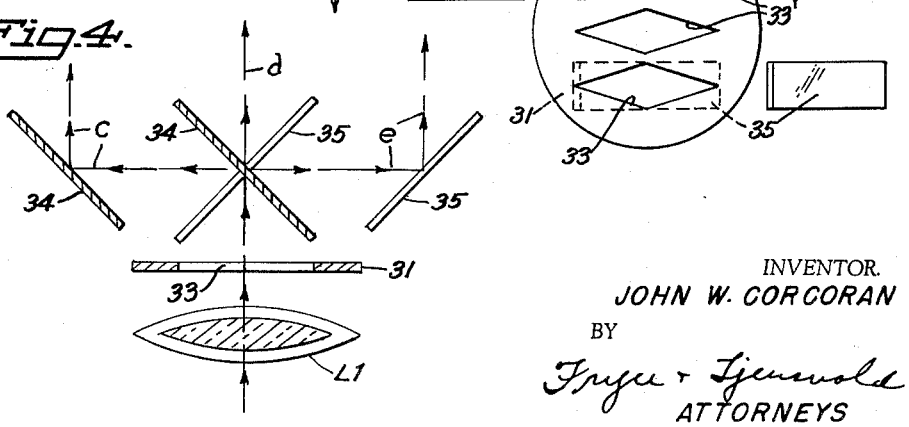
INVENTOR.
JOHN W. CORCORAN
BY
Fryer + Tjensvold
ATTORNEYS Dec. 15, 1964   J. W. CORCORAN   3,161,885
FRAMING CAMERA WITH RECTANGULARLY GROUPED FRAME AREA
Filed Feb. 25, 1963   2 Sheets-Sheet 2
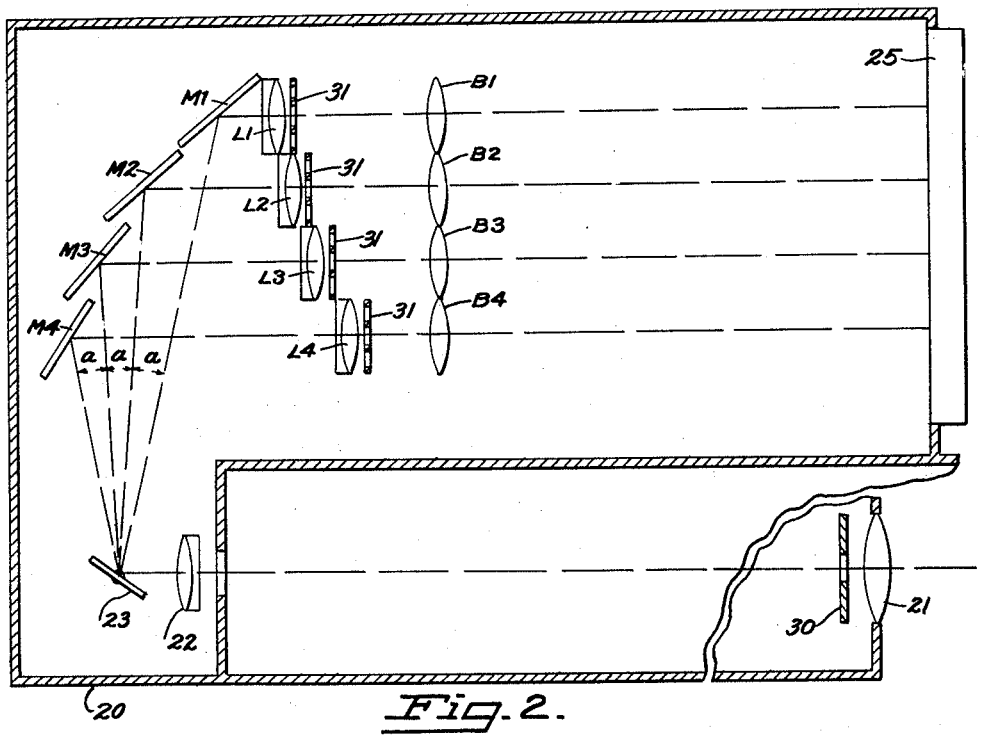
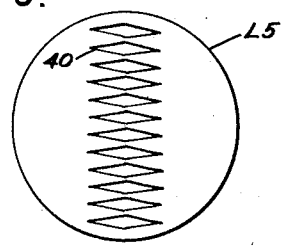
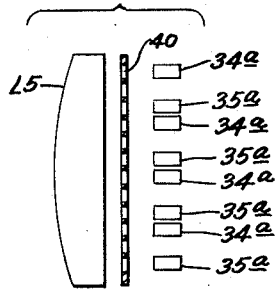
INVENTOR.
JOHN W. CORCORAN
BY
Fryer & Gunsolde
ATTORNEYS – # United States Patent Office 3,161,885
Patented Dec. 15, 1964

3,161,885
FRAMING CAMERA WITH RECTANGULARLY GROUPED FRAME AREA
John W. Corcoran, Redwood City, Calif., assignor to Beckman & Whitley, Inc., San Carlos, Calif., a corporation of Delaware
Filed Feb. 25, 1963, Ser. No. 260,763
5 Claims. (Cl. 352—84)

This invention relates to framing cameras and particularly to a high speed rotating mirror-type camera in which successive exposures of an event are created to produce frames or records in orderly succession in a substantially rectangular pattern as distinguished from the rectilinear arrangement of frames of conventional high speed cameras.

Generally speaking, rotating mirror or rotating prism type cameras sweep a beam or bundle of light containing a focused and reflected image of an event to be recorded over the length of a long strip of film. The film is usually supported in a suitably curved position and properly arranged stops and relay lenses are employed to effect spaced exposures of the event in a single line or row disposed lengthwise of the film. An obvious disadvantage results from the fact that the record produced is often too long to be displayed on the page of an average book or report and reproduction must include rearrangement of the frames into a more compact space.

Another great disadvantage of framing cameras is their exceedingly high cost. Since a separate set of relay lenses is used for each frame, and space does not permit the type of lenses required, slicing of lenses has been resorted to. In a sliced lens, only a narrow central section of the lens is used. Furthermore slicing is a delicate and costly operation and is not economical with anastigmats and some other multi-part lenses often highly desirable in framing cameras.

It is, therefore, an object of the present invention to overcome the above and other disadvantages of conventional cameras of the high-speed framing type, to provide a relatively small and inexpensive camera for producing discrete records in an orderly arrangement and practical format, and to reduce the number of lenses required per record frame, thereby eliminating the necessity of slicing lenses and permitting the use of larger and more complex lenses to obtain superior resolution.

Another object of the invention is to provide a camera in which the angular motion of a bundle of light as reflected from a rotating mirror is converted to an essentially linear displacement and further translated into a displacement perpendicular to the linear displacement to produce a progressive motion pattern comparable to the raster of a cathode ray tube.

Still further and more specific objects and advantages of the invention are made apparent in the following specification wherein the invention is described by reference to the accompanying drawings.

In the drawings:

FIG. 1 is a schematic view in perspective illustrating the approximate relative positions of the parts of a camera constructed in accordance with the present invention;

FIG. 2 is a schematic view in side elevation of the camera components shown in FIG. 1;

FIG. 3 is a detail view illustrating the relationship in elevation of one of the front relay lenses of the camera, a multiple aperture mask associated therewith and mirror elements;

FIG. 4 is a sectional view taken on the line IV—IV of FIG. 3;

FIG. 5 is a schematic view in front elevation of a modification of the relay lens system of the invention; and FIG. 6 is a schematic view in side elevation of the same.

The general arrangement of the components of a camera of the present invention is shown in FIGS. 1 and 2 wherein light enters a camera housing indicated at 20 through an objective system comprising an objective lens, shown only in FIG. 2 at 21, and a field lens 22. The objective lens focuses light from an object or event to be recorded at the face of a rotating mirror 23. The bundle of light so focused is swung by the rotating mirror across the faces of stationary mirrors M–1, M–2, M–3 and M–4, successively, each in turn reflecting through front relay lenses L–1 to L–4. A mask or stop with three apertures and two sets of mirrors, to be described hereinafter in greater detail, serve to direct the bundle of light from each front relay to a horizontally illustrated series of three back relays B–1 to B–4, inclusive, corresponding in position to frame areas 1 to 12, inclusive, on an image plane 25 where a film to be exposed will be supported.

To summarize the sequence of exposures before going into further structural details, the image at the face of the mirror 23 is swung in a counterclockwise direction across the faces of the mirrors M–1 to M–4 and the reflected image is swung downwardly over the front relays L–1 to L–4. The stop and mirror system behind the relay L–1 directs the image first to the leftmost back relay B–1, as shown in FIG. 1, thence to the central back relay B–1 and finally to the rightmost back relay B–1. The latter relays focus an image to expose film at the image plane in the frame areas 1, 2 and 3, successively. As the beam from the rotating mirror 23 continues downwardly to sweep across the stationary mirror M–2, it is directed through the front relay L–2 and through the second tier of back relays B–2 to be exposed on frame areas 4, 5 and 6. Similarly, mirror M–3 exposes frames 7, 8 and 9 while mirror M–4 exposes frame areas 10, 11 and 12.

The manner in which a beam swinging in a vertical plane from the rotating mirror and stationary mirrors is displaced horizontally between the front relays and the four sets of back relays is best understood from FIGS. 3 and 4 illustrating the relationship of front relays L–1, etc., with stops and mirrors.

It is conventional practice in rotating mirror type framing cameras to employ stops usually having diamond shaped apertures, one in the objective system as shown at 30 in FIG. 2 and one for each set of relay lenses. Thus as the bundle of light from the stop in the objective system is focused and reflected through the relay system, it passes over the aperture in the stop of the latter system to expose the film. In the present camera, the stops of the relay system are disposed directly behind the front relay lenses as at 31 in FIG. 2 and contain three apertures of diamond shape for each lens, the apertures being best illustrated at 33 in FIG. 3. Thus the light passes through each front relay lens three successive times. As it passes through the uppermost of the three apertures 33, it impinges a pair of angularly related mirrors 34, see FIGS. 3 and 4, so that the light follows the path of the arrows c in FIG. 4 and is directed toward the leftmost of the back relays B–1 in FIG. 1. The light passes directly through the second or central aperture 33 to meet the central back relay lens B–1 (arrows d) and then through the lower aperture to be reflected by angularly related mirrors 35 to the right hand back relay lens B–1 (arrows e). The stop and mirror system for each of the front relays is substantially identical in order to produce successive exposures in the frame areas 1 to 12 as previously described.

The optics of the camera other than those hereinbefore described are simple and obvious. The path of light from the objective system and from the rotating mirror to the stationary mirrors and front relay lenses is indicated by broken lines in FIG. 2 wherein the angles "a" between the centers of the beam from the rotating mirror to the centers of the stationary mirrors are shown as equal to accomplish uniform spacing in time of the exposures on the film. Furthermore the stationary mirrors and front relay lenses are offset to provide uniform focal distance between the field lens 22 and each of the several front relay lenses. Since the front relay lenses are collimators, the different effective distance between the front relay lenses and back relay lenses caused by the interposition of mirrors 34 and 35 has no significant effect on the resolution of the exposure.

As a modification of the form of the invention described above, a single front relay lens may be substituted for the four lenses L–1 to L–4 thus enabling the use of an even larger and more sophisticated lens in the relay optics without the necessity of slicing. Such an arrangement is illustrated in reduced size in FIGS. 5 and 6 wherein a front relay lens, illustrated schematically at L–5, having a single stop with 12 apertures 40 arranged in alignment is shown. These apertures act in the same manner as the 12 apertures associated with the four lenses L–1 to L–4 in FIG. 2 and sets of mirrors corresponding to the mirrors 34 and 35 of FIGS. 3 and 4 are arranged as shown in FIG. 6 at 34a and 35a at the first and third apertures as well as the fourth and sixth, seventh and ninth and the tenth and twelfth. Thus the succession of exposures at the film plane is the same as that described in connection with FIG. 1.

I claim:

1. A framing camera comprising an objective optical system for focusing the image of an event to be recorded, a rotating mirror for sweeping a bundle of light containing said image, a series of angularly related stationary mirrors intercepting and reflecting said light bundle to direct it sequentially over a series of front relay lenses, a film plane, three rear relay lenses disposed between each front relay lens and the film plane and spaced from each other in a direction substantially perpendicular to the direction of movement of said sweeping bundle, and a mirror system interposed between the front and rear relay lens, to direct the bundle sweeping each front lens successively to three rear lenses to be focused at the film plane in three separate frame spaces.

2. The camera of claim 1 in which the stationary mirrors and front relay lenses are disposed to present a constant focal distance between the objective system and the relay system.

3. The camera of claim 1 with an apertured stop in the objective system and with apertured stops in the relay system to effect shuttering of the light bundle at the film plane.

4. A framing camera comprising means to sweep a bundle of light containing an image of an event to be recorded in one direction across a front relay lens, a group of rear relay lenses spaced from each other in a direction substantially perpendicular to said first named direction, and mirrors between the front and rear relay lenses to reflect said bundle successively to said group of rear relay lenses, and a film plane at which said image is focused in spaced frames by said relay lenses.

5. The framing camera of claim 4 having more than one group of relay lenses in which the groups are spaced in said first direction to produce spaced framed exposures at the film plane in a substantially rectangular pattern.

References Cited in the file of this patent

UNITED STATES PATENTS

| | | |
|---|---|---|
| 1,424,886 | Douglass | Aug. 8, 1922 |
| 2,400,887 | Miller | May 28, 1946 |
| 2,627,199 | O'Brien | Feb. 3, 1953 |